(12) United States Patent
He

(10) Patent No.: US 8,867,185 B2
(45) Date of Patent: Oct. 21, 2014

(54) METHOD AND DEVICE FOR PROTECTION ZONE SELECTION IN A MULTIPLE BUSBAR ARRANGEMENT

(71) Applicant: Li He, Vasteras (SE)

(72) Inventor: Li He, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 14/136,949

(22) Filed: Dec. 20, 2013

(65) Prior Publication Data

US 2014/0111897 A1    Apr. 24, 2014

Related U.S. Application Data

(63) Continuation of application No. PCT/EP2011/060224, filed on Jun. 20, 2011.

(51) Int. Cl.
*H02H 7/00* (2006.01)
*H02H 7/30* (2006.01)
*H02H 7/26* (2006.01)

(52) U.S. Cl.
CPC .. *H02H 7/30* (2013.01); *H02H 7/26* (2013.01)
USPC .......................................................... 361/64

(58) Field of Classification Search
USPC .......................................................... 361/64
See application file for complete search history.

(56) References Cited

U.S. PATENT DOCUMENTS

| | | | | |
|---|---|---|---|---|
| 4,689,708 | A * | 8/1987 | Hager et al. | 361/65 |
| 5,568,399 | A | 10/1996 | Sumic | |
| 6,008,971 | A | 12/1999 | Duba et al. | |
| 6,411,865 | B1 | 6/2002 | Qin et al. | |
| 2003/0184936 | A1 | 10/2003 | Wimmer et al. | |

FOREIGN PATENT DOCUMENTS

| | | |
|---|---|---|
| EP | 0175120 A1 | 3/1986 |
| GB | 2463125 A | 3/2010 |
| WO | 2004064219 A2 | 7/2004 |
| WO | 2007090302 A2 | 8/2007 |
| WO | 2008146358 A1 | 4/2008 |
| WO | 2009076410 A1 | 6/2009 |
| WO | 2009127817 A1 | 10/2009 |
| WO | 2010034149 A1 | 4/2010 |
| WO | 2010142525 A1 | 12/2010 |

OTHER PUBLICATIONS

International Search Report & Written Opinion of the International Searching Authority Application No. PCT/EP2011/060224 Completed Jun. 26, 2012; Mailing Date: Jul. 5, 2012 9 pages.

* cited by examiner

*Primary Examiner* — Stephen W Jackson
(74) *Attorney, Agent, or Firm* — St. Onge Steward Johnston & Reens LLC

(57) ABSTRACT

Method of protection zone selection in a multiple busbar arrangement, the multiple busbar arrangement including busbar zones and bays connectable to the busbar zones, which bays include measurement transformers. The method includes the steps of: receiving first connection data including information of an operational status of measurement transformer to busbar zone connections; determining all pairs of connected busbar zone to busbar zone connections based on the first connection data; comparing data representing pairs of busbar zone to busbar zone connections, based on the comparing; assigning each pair of busbar zones which has a busbar zone in common with at least another pair of busbar zone to busbar zone connection to a respective protection zone; and defining any busbar zone that is not connected to any other busbar zone as a protection zone. The present invention also relates to a computer program product and a device for carrying out the method.

12 Claims, 3 Drawing Sheets

$$B = \begin{array}{c} \\ \text{Bay1} \\ \text{Bay2} \\ \text{Bay3} \\ \text{Bay4} \\ \text{Bay5} \end{array} \begin{bmatrix} \text{Section} & ZA & ZB & ZC & \text{Section} & ZA & ZB & ZC \\ 1 & 1 & 1 & 0 & 0 & 0 & 0 & 0 \\ 1 & 1 & 0 & 0 & 1 & 1 & 0 & 1 \\ 1 & 1 & 0 & 0 & 2 & 0 & 0 & 1 \\ 2 & 1 & 0 & 0 & 2 & 0 & 1 & 0 \\ 2 & 1 & 0 & 0 & 0 & 0 & 0 & 0 \end{bmatrix}$$

METHOD AND DEVICE FOR PROTECTION ZONE SELECTION IN A MULTIPLE BUSBAR ARRANGEMENT

FIELD OF THE INVENTION

The present disclosure generally relates to digital busbar protection in power systems and in particular to dynamic protection zone selection in a multiple busbar arrangement.

BACKGROUND OF THE INVENTION

In a power network, such as a transmission and distribution grid, a busbar provides common connection for several electric circuits. A busbar may for instance form part of a substation. Busbar faults, although relatively rare compared to line faults, may cause significant loss and disturbances in the power network.

Intelligent Electronic Devices (IED) are utilized to provide reliable protection against busbar-related short circuits and ground faults. In case a fault occurs on a busbar, all circuits supplying the fault current must trip, i.e. they must be disconnected, in order to isolate the fault.

A multiple busbar arrangement comprises several busbars. A busbar arrangement is often divided into so-called bus zones with each bus zone bounded by circuit breakers to further reduce the impact of busbar faults. A protection zone is a protection area of one or more merged bus zones. Protection zones for a given busbar arrangement may vary and should be dynamically selected.

Efficient dynamic zone selection is a key function for digital busbar protection. Numerical-algorithm-based zone selection ensures accurate yet fast dynamic linking of measurement transformers to appropriate protection zones and selectively determine the circuit breakers to trip in the event of a busbar fault.

U.S. Pat. No. 6,411,865 provides a system for protection zone selection in an electric power system. The system uses graph theory in order to represent a power system bus arrangement in such a way that the protection zones for the bus can be readily changed to accommodate a change of configuration of the bus arrangement.

However, the approach of U.S. Pat. No. 6,411,865 may be quite complex.

SUMMARY OF THE INVENTION

Hence, there is a need to provide a simple and computationally efficient method for dynamically selecting protection zones in a multiple busbar arrangement.

A general object of the invention is to provide a simple method of dynamic protection zone selection in a multiple busbar arrangement.

Another object is to provide a device which is arranged to carry out the said method.

A further object is to provide an alternative to existing solutions for dynamic protection zone selection in a multiple busbar arrangement.

In a first aspect of the present disclosure there is provided a method of protection zone selection in a multiple busbar arrangement, the multiple busbar arrangement comprising busbar zones and bays connectable to the busbar zones, which bays comprise measurement transformers, wherein the method comprises:
receiving first connection data comprising information of an operational status of measurement transformer to busbar zone connections,
determining all pairs of connected busbar zone to busbar zone connections based on the first connection data,
comparing data representing pairs of connected busbar zone to busbar zone connections,
based on the comparing, assigning each pair of busbar zone which has a busbar zone in common with at least another pair of connected busbar zone to busbar zone connection to a respective protection zone, and
defining any busbar zone that is not connected to any other busbar zone as a protection zone.

Beneficially, by means of the present invention fewer operational steps need to be executed in order to dynamically determine or select the protection zones for a multiple busbar arrangement. As a result, the present method provides a simple algorithm with less computing operations reducing the computational power needed to perform the method. Hence, protection zone selection can be performed faster than in known methods.

One embodiment comprises assigning each measurement transformer which is connected to a busbar zone to the protection zone of the said busbar zone by utilizing the first connection data. By assigning the measurement transformers this way, it can easily be determined which measurement transformers are to be disconnected from a protection zone exhibiting a fault in order to protect those bays where no fault is present, but which are connected to the protection zone exhibiting the fault.

One embodiment comprises arranging the first connection data in a first data structure in a predefined order.

In one embodiment the step of determining comprises scanning through the first data structure whereby a busbar zone is determined to be connected to another busbar zone if a predefined value in a position in the first data structure comprising busbar to measurement transformer connection data is equal to a value in another position, in the same row or same column, in the first data structure comprising busbar to measurement transformer connection data.

One embodiment comprises arranging the data representing the pairs of busbar zone to busbar zone connections in a second data structure according to a predefined order.

In one embodiment the comparing is based on the set theoretical operation of intersection of data representing pairs of busbar zone to busbar zone connection.

In one embodiment the assigning is based on the set theoretical operation of union of such data representing pairs of busbar zone to busbar zone connection which in the step of comparing has a non-empty intersection.

In one embodiment the multiple busbar arrangement further comprises at least two sections, and the method comprises receiving second connection data pertaining to all connections between corresponding busbar zones in adjacent sections and the step of determining all pairs of busbar to busbar zone connections is further based on the second connection data.

One embodiment comprises receiving command data comprising a busbar zone merging command, wherein the step of determining all pairs of connected busbar zone connections includes such pairs of busbar zones which are to be merged according to the command data.

The method according to the first aspect may be implemented as a computer program product. The computer program product may comprise storage means for storing program code which when executed performs the method according to the first aspect.

In a second aspect of the present disclosure there is provided a device for protection zone selection in a multiple busbar arrangement, the multiple busbar arrangement comprising busbar zones and bays connectable to the busbar zones, which bays comprise measurement transformers, wherein the device comprises:

an input device arranged to receive first connection data comprising information of an operational status of measurement transformer to busbar zone connections, and a processor arranged to:

determine all pairs of connected busbar zone to busbar zone connections based on the first connection data, compare data representing pairs of connected busbar zone to busbar zone connections, assign each pair of busbar zone which has a busbar zone in common with at least another pair of connected busbar zone to busbar zone connection to a respective protection zone based on the compared data, and define any busbar zone that is not connected to any other busbar zone as a protection zone.

The device according to the second aspect is hence adapted to carry out the method according to the first aspect of the present invention by means of software installed in the device, preferably in the processor.

In one embodiment the processor is arranged to assign each measurement transformer which is connected to a busbar zone to an associated protection zone by utilizing the first connection data.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

In general, the methods for dynamic protection zone selection presented herein utilize several different types or levels of information. A first type of information used for dynamically determining the protection zones of a multiple busbar arrangement is static system data. Such information comprises the static configuration of the multiple busbar arrangement, and can for instance include the number and types of bays, the number of sections, the number of bus zone, and the static configuration of the measurement transformers at the bays, and circuit breakers and disconnectors. These data do not change dynamically and can be programmed in e.g. the IED which executes the methods disclosed herein.

A second type of information is dynamic data concerning the operational status of the disconnectors for each bay in the multiple busbar arrangement. This information is dynamic, since the operational status of the disconnectors is dynamic. This information can be provided as data from bay units in the multiple busbar arrangement. The second type of information will in the following be termed as first connection data, as will be elaborated further in the following.

A third type of information comprises dynamic data concerning the operational status of cross-sectional disconnectors, i.e. disconnectors which are arranged to connect adjacent sections if the multiple busbar arrangement comprises more than one section. Furthermore, the third type of information can also comprise zone interconnection/merge forcing parameters, which are a busbar zone merging commands from e.g. an operator or engineer monitoring the multiple busbar arrangement to force pair-wise busbar zone merging (s). The third type of information will in the following be referred to as second connection data when the data concerns the operational status of cross-sectional disconnectors, and busbar merging zone commands when concerning zone interconnection forcing parameters provided by an operator.

The above presented three types of information can be used as input data in the methods presented herein for dynamically determining or selecting protection zones in a multiple busbar arrangement. To this end, the present disclosure provides a simplified method on dynamic identification of the protection zones and utilizes simple matrix representations and set theoretical operations.

Figure 1:
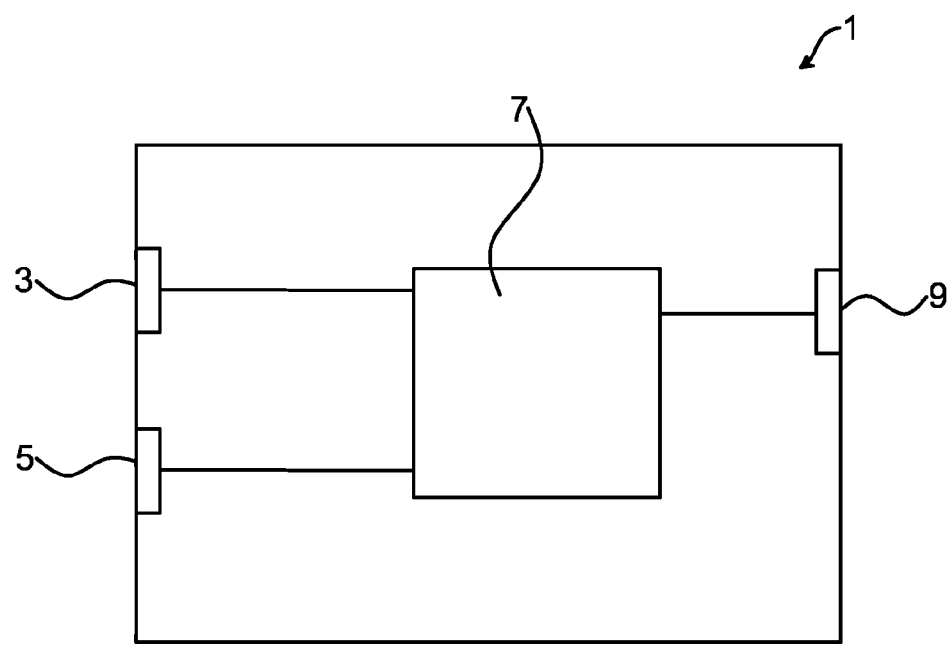
FIG. 1 shows a schematic block diagram of a device for protection zone selection in a multiple busbar arrangement.

FIG. 1 discloses a device 1, which in the following will be exemplified by an Intelligent Electronic Device (IED). It is to be noted that the device 1 may be any kind of device suitable for protecting, monitoring and controlling a power system such as a busbar.

The device 1 may be utilized in a power system such as a multiple busbar arrangement. In the following, the device 1 will be used in the context of a multiple busbar arrangement.

The device 1 may be used for monitoring signals pertaining to the state of the power system, and for controlling circuit breakers and similar devices in the power system.

The device 1 has a first input device 3. The first input device 3 may provide one or several inputs to the device 1. The first input device 3 may for instance be adapted to receive analog input signals from one or more sensors which measure currents in the multiple bus arrangement. The first input device 3 may optionally or additionally be adapted to receive analog input signals from one or more sensors which measure voltages in the multiple bus arrangement. Such measured voltages and/or currents may be provided by means of measurement transformers in the multiple busbar arrangement. A measurement transformer may for instance be a Current Transformer (CT) or a Voltage Transformer (VT). In the following, a measurement transformer will be exemplified by a CT.

The device 1 further comprises a second input device 5. The second input device 5 may provide one or several inputs to the device 1. The second input device 5 may for instance be a binary input device adapted to receive binary information regarding the state of one or more circuit breakers and/or disconnectors in the multiple busbar arrangement. The state, i.e. operational status, of a circuit breaker or a disconnector denotes whether it is in an open state or in a closed state. The second input device 5 may hence be able to receive first connection data and second connection data regarding a multiple busbar arrangement. In particular, in one embodiment, the device 1 is adapted to receive first connection data regarding the operational status disconnectors from all bays of a multiple busbar arrangement, when the device 1 is connected thereto.

The device 1 is also adapted to receive busbar zone merging commands which can either be input directly to the device 1 via e.g. a user interface, or via the reception of the busbar zone merging commands from an external control unit which can interact with a user.

The device 1 has a processor 7. The processor 7 is arranged to receive data from the first input device 3 and the second input device 5. The processor 7 is arranged to process data received from the first input device 3 and the second input device 5. By processing data from the first input device 3, the processor 7 is adapted to determine whether there is a fault current in the multiple busbar arrangement. The processor 7 may further include software which when executed performs the method of protection zone selection in a multiple busbar arrangement, as will be described in more detail herebelow.

The device 1 further comprises an output device 9. The output device 9 is arranged to provide trip instructions to trip one or more circuit breakers in the multiple busbar arrangement.

An example of a multiple busbar arrangement in which the protection zones can be selected or determined according to the methods presented herein will now be described with reference to FIG. 2. It is however to be noted that the methods and the device presented herein may equally efficiently be used in other multiple busbar arrangements, comprising fewer or more sections, disconnectors and/or bays.

Figure 2:
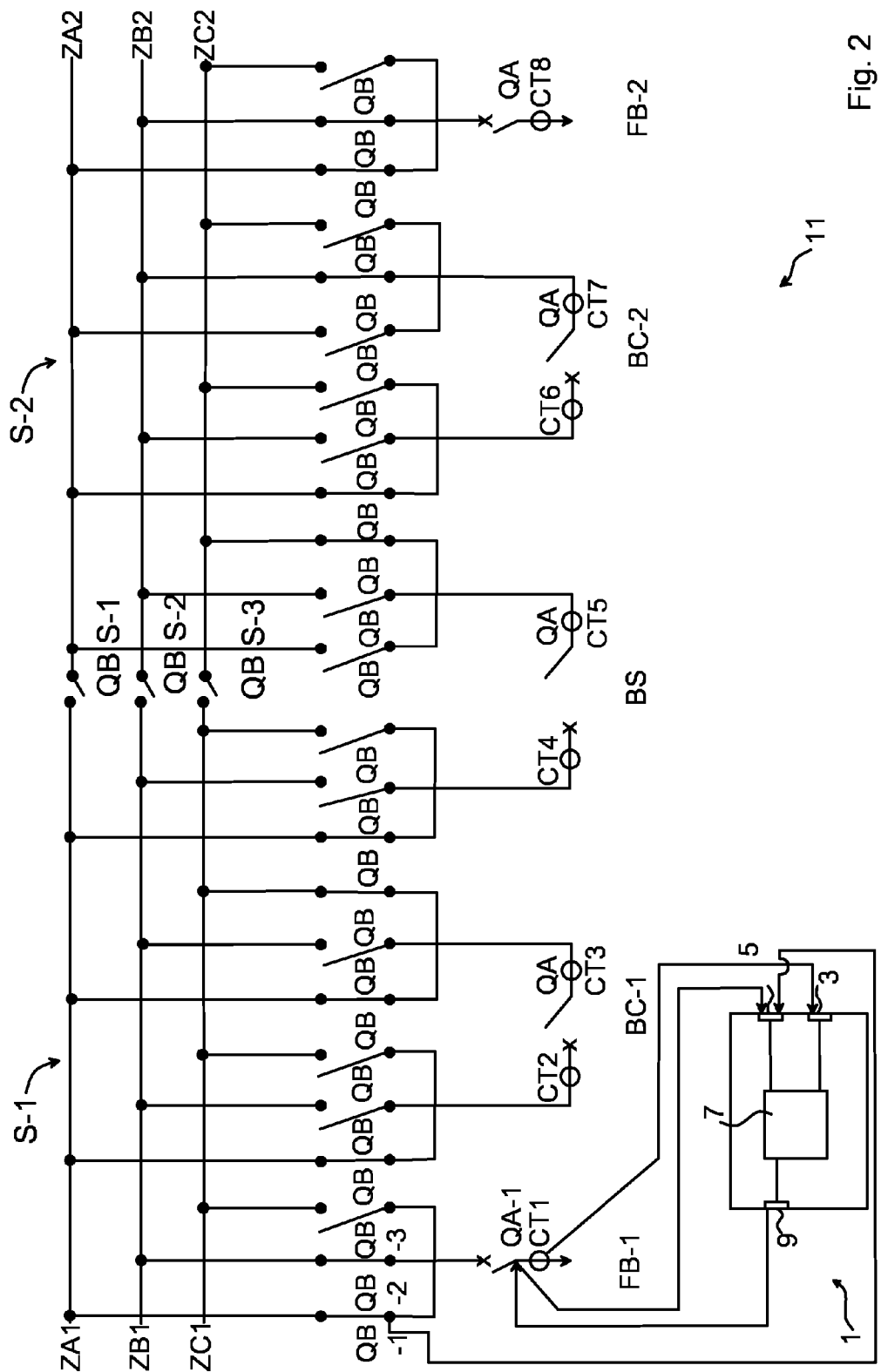
FIG. 2 shows a schematic diagram of an example of a multiple busbar arrangement.

FIG. 2 shows an example of a multiple busbar arrangement 11, which can be protected, monitored and controlled by means of the device 1.

The exemplified multiple busbar arrangement 11 comprises a plurality of busbar zones ZA1, ZB1, ZC1 and ZA2, ZB2, ZC2. The busbar arrangement 11 has two sections in the present example, but may also have more than two sections. Thus, the busbar arrangement 11 has a first section S-1, and a second section S-2. The first section S-1 comprises busbar zones ZA1, ZB1 and ZC1. The second section S-2 comprises busbar zones ZA2, ZB2 and ZC2.

The first section S-1 and the second section S-2 may selectively be connected by means of sectionalizing disconnectors QBS-1, QB2-2 and QBS-3. In particular, disconnector QBS-1 is arranged to selectively connect busbar zones ZA1 and ZA2. Disconnector QBS-2 is arranged to selectively connect ZB1 and ZB2. Disconnector QBS-3 is arranged to selectively connect ZC1 and ZC2. Each disconnector QBS-1, QB2-2 and QBS-3 may be monitored and controlled by means of device 1 or a similar monitoring device.

The multiple busbar arrangement 11 further comprises a plurality of disconnectors QB, such as QB-1, QB-2 and QB-3. The disconnectors QB are arranged to selectively connect measurement transformers at bays to the busbar zones within a section.

The multiple busbar arrangement of the present example comprises a plurality of bays FB-1, BC-1, BS, BC-2 and FB-2. The bays may be connected to the busbar zones by means of disconnectors QB.

A first feeder bay FB-1 is connectable to the first section S-1. The first feeder bay FB-1 is a bay which can connect the multiple busbar arrangement 11 to a power line, e.g. a distribution network or a transmission network.

A bus-coupler bay BC-1 is connectable to section S-1. The bus-coupler bay BC-1 may be connected to the busbar zones in the first section S-1 e.g. for switching purposes of the first section S-1.

A bus section bay BS where two sets of measurement transformers CT4 and CT5 located on both side of the associated circuit breaker is connectable to both the first section S-1 and the second section S-2.

Similarly, a bus-coupler bay BC-2 is connectable to section S-2. The bus-coupler bay BC-2 may be connected to the busbar zones in the second section S-2 e.g. for switching purposes of the second section S-2.

A second feeder bay FB-2 is connectable to the second section S-2.

Each bay mentioned hereabove comprise measurement transformers, i.e. current transformers CT1, CT2, CT3, CT4, CT5, CT6, CT7, and CT8 which are distributed in the bays in the present example. Each bay also comprises protective devices such as circuit breakers QA.

The multiple busbar arrangement 11 further comprises device 1. The device 1 in FIG. 2 is only connected to the first feeder bay FB-1 for simplifying the overview of the figure. However, it is to be noted that normally the device 1 may be connected to all bays and all CTs for protecting, monitoring and controlling the complete multiple busbar arrangement 11. Alternatively, the multiple busbar arrangement may comprise a plurality of devices 1, each connected to one or more bays, wherein the plurality of devices should communicate with each other or with a central control unit in order to obtain a complete overview of the multiple busbar arrangement.

The first input 3 of the device 1 is connected to CTs for receiving measurement signals therefrom. The second input device 5 is connected to circuit breakers, such as QA-1 in the illustration in FIG. 2, in order to receive status data from the circuit breaker QA-1, e.g. whether it is open or closed. The second input device may be connected to one or more bay units in order to receive first connection data comprising information concerning the operational status of the disconnectors. Furthermore, the output device 9 of the device 1 is arranged to trip the circuit breaker QA-1, i.e. to open the circuit breaker if for instance a fault current has been detected by means of current transformer CT1.

It is to be noted that the protection zone selection method presented herein may be used for more complicated multiple busbar arrangement configurations than the multiple busbar arrangement 11 exemplified herein. As an example, the REB670 IED model provided by ABB® may provide protection zone selection for up to 48 bays in a triple busbar substation with six busbar zones when implementing the present method. The monitoring hardware, e.g. an IED, is generally what limits the application of the method presented herein, as the present method may be utilized for any type of multiple busbar arrangement configurations.

By means of the method presented herein, it is possible to, in a structured way, collect data pertaining to the dynamical configuration of a multiple busbar system. By dynamical configuration is meant how each measurement transformer is connected to busbar zones at each bay, and also busbar zone connection between adjacent sections. By means of the collected data, the present invention provides a method to dynamically select protection zones in a multiple busbar arrangement in a simple way. Said method will be presented in more detail herebelow.

Figures 3, 4:
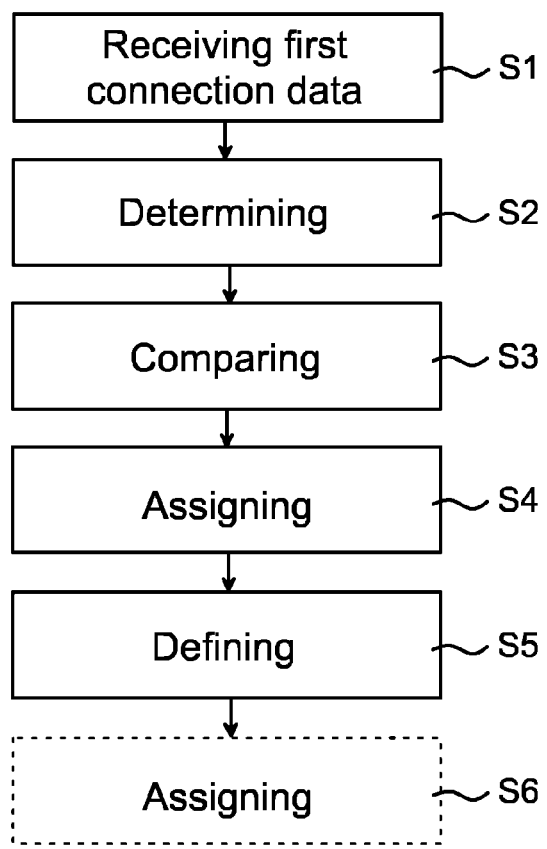
FIG. 3 shows an example of a bay-assignment matrix.
FIG. 4 shows a flowchart of a method for protection zone selection in a multiple busbar arrangement.

FIG. 3 shows a first data structure in the form of a matrix B, also referred to as a bay-assignment matrix. The first data structure shown in FIG. 3 is an example of a data structure suitable to represent the first connection data for the multiple busbar arrangement 11 in FIG. 2.

Further reference will be made herebelow to FIG. 5 which illustrates a flowchart of an example of a method for selecting protection zones in a multiple busbar arrangement.

The device 1 may receive first connection data to its first input device 3 in a step S1. The first connection data may comprise information regarding the operational status of measurement transformer to busbar zone connections. As an example, in FIG. 2, the device 1 may receive first connection data that includes information that the CT at the first feeder bay FB-1 is connected to the busbar zones ZA1 and ZB1 in the first section S-1, since the operational status of the corresponding disconnector QB-1, QB-2 are all closed.

The first connection data is imported to and arranged in the first data structure according to a predefined order. In one embodiment, the first connection data is arranged in such a way in the first data structure that it can easily be determined, e.g. by scanning the first data structure without any additional data processing, to which measurement transformer of several measurement transformers in a bay a busbar zone is connected.

In the present example each bay is associated with a respective matrix row of the first data structure. The columns represent the busbar zones and section information.

In the present example of the data structure, each bay is uniquely determined by means of the two section parameters as follows.

If the section parameters are a combination of integers 1 and 0, the bay is a bus feeder bay such as the first feeder bay FB-1, in the first section S-1, with reference to the example in FIG. 2. The corresponding first connection data is inserted into the first data structure in the first row.

A connection between a busbar zone and a measurement transformer by means of a disconnector QA is stored as an integer 1 in an element in the bay-assignment matrix which represents that that specific measurement transformer to busbar zone connection. A measurement transformer which is not connected to a busbar zone in the section in which the busbar zone is located is stored as a 0 in the position of the bay-assignment matrix which represent that specific measurement transformer to busbar zone connection. Thus, returning to the example of FIG. 2, in each of the second and third column in the first row of the bay-assignment matrix, an integer 1 is stored. Since there is only one measurement transformer, i.e. CT1, at the feeder bay FB-1, in the remaining positions in the first row of the bay assignment matrix, a 0 is stored.

If the section parameters are both integers 1 or both integers 2, the bay is a bus coupling bay, such as bus coupler bay BC-1 or BC-2. The integer 1 or 2 denotes the section to which each measurement transformer at the bus coupling bay belongs in case of a two-section multiple bus arrangement. An integer 1 denotes that a measurement transformer at the bus coupling bay belongs to the first section S-1. An integer 2 denotes that a measurement transformer at the bus coupling bay belongs to the second section S-2.

The first set of busbar zones ZA, ZB and ZC in the second row of the bay-assignment matrix denotes connections of the busbar zones ZA1-ZC1 to the left-hand branch of the first bus coupling bay BC-1 in the single line diagram in FIG. 2, i.e. to measurement transformers CT2 and CT3. The second set of busbar zones ZA, ZB and ZC in the second row of the bay-assignment matrix denotes connections of the busbar zones ZA1-ZC1 to the right-hand branch of the first bus coupling bay BC-1 in the single line diagram in FIG. 2.

The busbar zone ZA1 is coupled to a measurement transformer CT2 in the left-hand branch of the first bus coupling bay BC-1, as denoted by the integer 1 in the bay-assignment matrix in row 2, column 2. The busbar zone ZC1 is coupled to the right-hand branch of the first bus coupling bay BC-1, as denoted by the integer in the bay assignment matrix in row 2, column 8.

If the section parameters in the first and fifth column differ but are not zero, e.g. 1 and 2, the bay is a bus section bay, such as bus section bay BS. The different integers denote that the bay is connectable to different sections, such as the first section S-1 and the second section S-2.

The first set of ZA-ZC in the third row of the bay-assignment matrix denotes busbar zones ZA1-ZC1. The second set of ZA-ZC in the third row of the bay-assignment matrix denotes busbar zones ZA2-ZC2. The example of FIG. 2 implies that the left transformer CT4 at the bus section bay BS is connected to ZA1 in section S-1 while the right transformer CT5 is connected to ZC2 in the section S-2. Therefore, in the corresponding row, row 3, column 2 and row 3, column 8 has stored an integer 1 therein. The remaining positions in the third row representing busbar zones have elements which are 0.

It is to be noted that the first data structure, i.e. the bay-assignment matrix may be represented in other ways than the example described above. The bay-assignment matrix may for instance be transposed, and other variations are also possible. The positions of the bay-assignment matrix may thus be associated with bus zones in many ways for describing the connections between measurement transformers at bays and busbar zones.

In an optional step, which is only executed in cases where the multiple busbar arrangement comprises at least two sections, second connection data is received by the device 1. The second connection data contains information concerning the operational status of inter-sectional busbar connections.

Typically, inter-sectional busbar connections are realized by means of connection of corresponding adjacent busbar zones. In FIG. 3, the corresponding adjacent busbar zones are ZA1 and ZA2; ZB1 and ZB2; and ZC1 and ZC2. Generally corresponding adjacent busbar zones in adjacent sections are those busbar zones which typically are presented along the same line in a single line diagram.

Corresponding busbar zones may be connected by means of disconnectors QBS-1, QBS-2 and QBS-3.

In the multiple busbar arrangement 11 of FIG. 2, none of the disconnectors QBS-1, QBS-2 and QBS-3 are closed. Hence, in the case of the multiple busbar arrangement configuration of FIG. 2, the second connection data indicates that there are no inter-sectional connections between corresponding busbar zones in adjacent sections.

In an optional step, the device 1 receives command data comprising pair-wise zone merging commands. Such commands can be input via a control system to which the device 1 is connected. Alternatively commands can be input directly into the device 1. The command data comprises user-selected busbar merging information.

In a second step S2, all pairs of connection between busbar zones in each section are determined from the first connection data. Moreover, in the present example having two sections, and pairs of inter-sectional connections between corresponding busbar zones in adjacent sections are determined based on the second connection data. In case command data has been received and contains busbar zone merging commands, the step S2 of determining also takes the command data into account when determining all pairs of connections between busbar zones.

In one embodiment, step S2 of determining may comprise scanning through the first data structure whereby a busbar zone is determined to be connected to another busbar zone if a predefined value in a position in the data structure comprising busbar to measurement transformer connection data is equal to a value in another position, in the same row or same column, in the data structure comprising busbar to measurement transformer connection data.

The determining in step S2 can be made by processor 7 of the device 1. The determining of all connections in each section may be made by utilizing the bay-assignment matrix. For instance, in the bay-assignment matrix example of FIG. 3 it can be seen that busbar zones ZA1 and ZB1 are connected via the first feeder bay FB-1. Busbar zone ZA1 is connected to busbar zone ZC1 via the bus coupling bay BC-1, i.e. via measurement transformer CT3. Furthermore, busbar zone ZA2 and ZB2 are connected via bus coupling bay BC-2.

In a third step S3 data representing pairs of busbar zone to busbar zone connections is compared. Preferably the pairs of busbar zone to busbar zone connections are arranged in a second data structure, such as a vector I, as will be explained in the following. The step S4 of comparing can be made before or after the data has been arranged in the second data structure.

In the example of FIG. 2 there are nine possible pairs of busbar zone to busbar zone connections. The pairs in the first section S-1 are ZA1-ZB1, ZA1-ZC1, and ZB1-ZC1. The pairs in the second section S-2 are ZA2-ZB2, ZA2-ZC2, and ZB2-ZC2. Cross-sectional pairs, i.e. pairs which can be connected to corresponding busbar zones in adjacent sections, are ZA1-ZA2, ZB1-ZB2, and ZC1-ZC2.

A presently active connection, i.e. where a disconnector is in its closed state, can for instance be represented by the integer 1 and if two busbar zones are disconnected, it can be represented by the integer 0. Each busbar zone may for simplicity be denoted by an integer from 1 to 6. For instance ZA1 may be associated with the integer 1, ZB1 may be associated with the integer 2, ZC1 may be associated with the integer 3, ZA2 may be associated with the integer 4, and so on.

The second data structure can thus generally be defined by the vector $$I=[x_{1,2}\,x_{1,3}\,x_{2,3}\,x_{4,5}\,x_{4,6}\,x_{5,6}\,x_{1,4}\,x_{2,5}\,x_{3,6}] \quad (1)$$

where each position represents a pair of busbar connections as elaborated above. For instance the first element $x_{1,2}$ represent the connection between ZA1 and ZB1. The elements of the second data structure may have a predefined order. Each position of the second data structure hence represents a connection between two particular busbar zones. An integer 1 at any position in the second data structure may represent a connection between the associated busbar zones. An integer 0 at any position second data structure may indicate that the corresponding busbar zones are disconnected.

Hence, in the example of FIG. 2, the second data structure based on the first connection data and the second connection data may have the following form $$I=[110100000]. \quad (2)$$

In set theoretical notation and based on the denotation of the busbar zones ZA1-ZC2 being numbered from 1-6, the vector I can be expressed as follows.

$$I=[\{1,2\}\{1,3\}\emptyset\{4,5\}\emptyset\emptyset\emptyset\emptyset\emptyset]. \quad (3)$$

As mentioned earlier, the second data structure can be utilized to compare each pair of connected busbar zones. The comparing may be carried out on the elements in the second data structure by means of the set theoretical operation of intersection of the subsets of the vector I.

If two pairs provide a non-empty output, i.e. have a non-empty intersection, those pairs are assigned to a protection zone for the multiple busbar arrangement in a step S4. Any pair which has a non-empty intersection with another pair is assigned to the same protection zone. This way, several disjoint protection zones can be defined in step S4.

In the example of equation (3) above, the first two elements are merged into a protection zone comprising busbar zones 1, 2 and 3. The fourth element defines a second protection zone comprising busbar zones 4 and 5.

In a fifth step S5 any busbar zone that is not connected to any other busbar zone is assigned to define a protection zone. In the case of equation (3), busbar zone 6 is not connected to any other busbar zone and hence defines a single protection zone. Thus, the protection zones for the example of FIG. 2 becomes ZA1, ZB1, ZC1 as a first protection zone, ZA2, ZB2 as a second protection zone, and ZC2 as a third protection zone.

In an sixth step S6 each measurement transformer which is connected to a busbar zone is assigned to an associated protection zone.

The mapping of the assignment between protection zones and measurement transformers can be represented in a data structure such as a matrix.

When implementing the methods described herein the following should also be taken into consideration in cases where there exists a so-called parallel connection in a bus section or bus coupler bay, i.e. in cases where either 1) there is only one measurement transformer in a bus section or bus coupler bay, wherein that measurement transformer is connected to a protection zone comprising multiple bus zones, or 2) when there are two measurement transformers in a bus section or bus coupler bay and both are assigned to the same protection zone.

When such a parallel connection exists, the parallel connection status should be communicated to ensure the corresponding current or voltage measurement(s) of the measurement transformer are forced to zero in the corresponding differential protection calculation. On the other hands, in the event of a busbar fault, trip instruction should be sent to the bus section or bus coupler bay anyway, even if there exists a parallel connection.

By the present protection zone selection method, a simple method for selecting protection zones is obtained, whereby efficient fault management in a multiple busbar arrangement having a complex configuration may be provided.

The skilled person in the art realizes that the present invention by no means is limited to the examples described hereabove. On the contrary, many modifications and variations are possible within the scope of the appended claims.

What is claimed is:

1. A method of protection zone selection in a multiple busbar arrangement, the multiple busbar arrangement comprising busbar zones and bays connectable to the busbar zones, which bays comprise measurement transformers, wherein the method comprises:
   receiving first connection data comprising information of an operational status of measurement transformer to busbar zone connections,
   determining all pairs of connected busbar zone to busbar zone connections based on the first connection data,
   comparing data representing pairs of busbar zone to busbar zone connections,
   based on the comparing, assigning each pair of busbar zones which has a busbar zone in common with at least another pair of busbar zone to busbar zone connection to a respective protection zone, and
   defining any busbar zone that is not connected to any other busbar zone as a protection zone.

2. The method as claimed in claim 1, comprising assigning each measurement transformer which is connected to a busbar zone to protection zone of the said busbar zone by utilizing the first connection data.

3. The method as claimed in claim 1, comprising arranging the first connection data in a first data structure in a predefined order.

4. The method as claimed in claim 3, wherein the step of determining comprises scanning through the first data structure whereby a busbar zone is determined to be connected to another busbar zone if a predefined value in a position in the data structure comprising busbar to measurement transformer connection data is equal to a value in another position, in the same row or same column, in the data structure comprising busbar to measurement transformer connection data.

5. The method as claimed in claim 1, comprising arranging the data representing the pairs of busbar zone to busbar zone connections in a second data structure according to a predefined order.

6. The method as claimed in claim 1, wherein the comparing is based on the set theoretical operation of intersection of data representing pairs of busbar zone to busbar zone connection.

7. The method as claimed in claim 6, wherein the assigning is based on the set theoretical operation of union of such data representing pairs of busbar zone to busbar zone connection which in the step of comparing has a non-empty intersection.

8. The method as claimed in claim 1, which multiple busbar arrangement further comprises at least two sections, and the method comprises receiving second connection data pertaining to all connections between corresponding busbar zones in adjacent sections and the step of determining all pairs of busbar to busbar zone connections is further based on the second connection data.

9. The method as claimed in claim 1, comprising receiving command data comprising a busbar zone merging commands, wherein the step of determining all pairs of connected busbar zone connections includes such pairs of busbar zones which are to be merged according to the command data.

10. A computer program product comprising storage means for storing program code which when executed performs a method of protection zone selection in a multiple busbar arrangement, the multiple busbar arrangement comprising busbar zones and bays connectable to the busbar zones, which bays comprise measurement transformers, wherein the method comprises:

receiving first connection data comprising information of an operational status of measurement transformer to busbar zone connections, determining all pairs of connected busbar zone to busbar zone connections based on the first connection data, comparing data representing pairs of busbar zone to busbar zone connections, based on the comparing, assigning each pair of busbar zones which has a busbar zone in common with at least another pair of busbar zone to busbar zone connection to a respective protection zone, and defining any busbar zone that is not connected to any other busbar zone as a protection zone.

11. A device for protection zone selection in a multiple busbar arrangement, the multiple busbar arrangement comprising busbar zones and bays connectable to the busbar zones, which bays comprise measurement transformers, wherein the device comprises:

an input device arranged to receive first connection data comprising information of an operational status of measurement transformer to busbar zone connections, and a processor arranged to:

determine all pairs of connected busbar zone to busbar zone connections based on the first connection data, compare data representing pairs of connected busbar zone to busbar zone connections, assign each pair of busbar zone which has a busbar zone in common with at least another pair of connected busbar zone to busbar zone connection to a respective protection zone based on the compared data, and define any busbar zone that is not connected to any other busbar zone as a protection zone.

12. The device as claimed in claim 11, wherein the processor is arranged to assign each measurement transformer which is connected to a busbar zone to an associated protection zone by utilizing the first connection data.

* * * * *